United States Patent
Lumelsky et al.

(10) Patent No.: US 6,516,350 B1
(45) Date of Patent: Feb. 4, 2003

(54) SELF-REGULATED RESOURCE MANAGEMENT OF DISTRIBUTED COMPUTER RESOURCES

(75) Inventors: Leon L. Lumelsky, Stamford, CT (US); Nelson R. Manohar, New York, NY (US); Stephen P. Wood, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,261

(22) Filed: Jun. 17, 1999

(51) Int. Cl.[7] ............................................. G06F 15/173
(52) U.S. Cl. ....................... 709/226; 709/224; 709/225; 709/229
(58) Field of Search ................................. 709/217, 219, 709/220, 221, 222, 223, 225, 226, 229, 231, 235; 710/36–40, 107, 200, 240–244; 711/150, 151

(56) References Cited

U.S. PATENT DOCUMENTS

| | | | | |
|---|---|---|---|---|
| 5,283,897 A | * | 2/1994 | Georgiadis et al. | 709/105 |
| 5,388,097 A | | 2/1995 | Baugher et al. | |
| 5,548,724 A | * | 8/1996 | Akizawa et al. | 709/203 |
| 5,581,703 A | | 12/1996 | Baugher et al. | |
| 5,774,660 A | * | 6/1998 | Brendel et al. | 709/201 |
| 5,774,668 A | * | 6/1998 | Choquier et al. | 709/223 |
| 5,881,238 A | * | 3/1999 | Aman et al. | 709/226 |
| 5,938,732 A | * | 8/1999 | Lim et al. | 709/229 |
| 5,956,716 A | * | 9/1999 | Kenner et al. | 707/10 |
| 6,021,426 A | * | 2/2000 | Douglis et al. | 709/200 |
| 6,070,191 A | * | 5/2000 | Narendran et al. | 709/226 |
| 6,078,960 A | * | 6/2000 | Ballard | 709/229 |
| 6,092,178 A | * | 7/2000 | Jindal et al. | 712/27 |
| 6,094,680 A | * | 7/2000 | Hokanson | 709/223 |
| 6,119,143 A | * | 9/2000 | Dias et al. | 709/201 |
| 6,128,644 A | * | 10/2000 | Nozaki | 709/203 |
| 6,167,427 A | * | 12/2000 | Rabinovich et al. | 709/201 |
| 6,202,080 B1 | * | 3/2001 | Lu et al. | 709/105 |
| 6,223,206 B1 | * | 4/2001 | Dan et al. | 709/105 |
| 6,240,454 B1 | * | 5/2001 | Nepustil | 709/229 |
| 6,263,368 B1 | * | 7/2001 | Martin | 709/224 |
| 6,279,001 B1 | * | 8/2001 | DeBettencourt et al. | 707/10 |
| 6,304,967 B1 | * | 10/2001 | Braddy | 713/150 |

OTHER PUBLICATIONS

Ian Foster, et al. (1998) "The Globus Project: A Status Report", Proc. IPPS/SPDP 98 Heterogeous Computing Workshop, pp. 4–48.

Saurav Chatterjee, et al. (1998) "ERDOS Qos Architecture, Technical Report", SRI International.

(List continued on next page.)

*Primary Examiner*—Saleh Najjar
(74) *Attorney, Agent, or Firm*—Scully, Scott, Murphy & Presser; Douglas W. Cameron

(57) ABSTRACT

A distributed system for the management of distributed resources interconnected by a computer network and comprised of a plurality of limited supply resources (such as those associated with multimedia content servers, e.g., bandwidth, CPU, storage, etc.,). The system comprises a plurality of server resources, preferably with target multimedia content, real time processing engines, etc., and a plurality of intermediary system resources (such as directories and resource monitors). The resources in any particular server are classified or partitioned as global or local, where the ratio of global to local is specified and controlled by the system. The system assigns clients across local and global resources and coordinates the placement of replicas of target content across global resources. The placement is dynamic and performed when necessary based on the analysis of utilization patterns of target content and replicas by pluralities of clients.

29 Claims, 9 Drawing Sheets

OTHER PUBLICATIONS

Chuck Song, et al. "Quality of Service Development in the VBNS", MCI Communications Corporation pp. 1–5; No date.

David K.Y. Yau, et al. (1996) "An Architecture Towards Efficient OS Support for Distributed Multimedia", SPIE vol. 2667, pp. 424–435.

Ingo Busse, et al. (1996) "Dynamic QoS Control of Multimedia Applications Based on RTP", Computer Communications 19, pp. 49–58.

Karl Czajkowski, et al. (1998) "A Resouce Management Architecture For Metacomputing Systems", Proc. IPPS/SPDP, pp. 62–82.

Cristina Aurrecoechea, et al. (1998) "A Survey of Qos Architectures", Multimedia Systems vol. 6, pp. 138–151.

Y. Bernet, et al. (1998) "A Framework for End–to–End QoS Combining RSVP/Intserv and Differentiated Services", Internet Draft, IETF, pp. 1–5.

Carsten Vogt, et al. (1998) "HeiRAT–Quality–of–Service Management for Distributed Multimedia Systems", vol. 6, pp. 152–166.

Andrew T. Campbell, et al. (1998) "Building Open Programmable Multimedia Networks", Computer Communications, pp. 758–770.

Klara Nahrstedt, et al. (1995) "Design, Implementation and Experiences of the OMEGA End–Point Architecture", Technical Report (MS–CIS–95–22), University of Pennsylvania, pp. 1–30.

Ian foster, et al. (1999) "The Grid: The Blueprint for a new computing Infrastructure", Chapter 19, pp. 379–503, Morgan Kauffman Publishers.

Andrew T. Campbell (1996) "A Quality of Service Architecture", PhD Thesis, Lnacaster University, pp. 1–242.

* cited by examiner

666

| Object_ID | Replica | Server | Transient Replica | Time-to-Live |
|---|---|---|---|---|
| 420 | 421 | 1211 | NO | |
| | 422 | 1221 | YES | 060599-133000 |
| 440 | 441 | 1211 | NO | |

| Server | IP Address | Capacity Rating | Utilization State | Timestamp | Globality |
|---|---|---|---|---|---|
| 1211 | 209.09.9.127 | Low | Red | t1 | local |
| 1221 | 128.0.0.1 | High | Green | t2 | global |

FIG. 7(b)

Note:
s1 is local storage bin,
s2 is global storage bin,
r1 (b1, c1, m1) is local service bin,
r2 (b2, c2, m2), and r3 (b3, c3, m3) are global service bins

SELF-REGULATED RESOURCE MANAGEMENT OF DISTRIBUTED COMPUTER RESOURCES

BACKGROUND OF THE INVENTION

1. Field of the Invention

The present invention relates generally to techniques for managing distributed multimedia resources on wide area networks characterized by large bandwidth and resource reservation capabilities, and, more specifically, to a system that provides the ability to map, reserve, monitor, and manage a dynamic plurality of computing and storage resources via a collection of arbitrators, policies and directories.

2. Discussion of the Prior Art

The task of leveraging the increased availability of widely distributed content and resources becomes very important with the proliferation of the next generation of the Internet, e.g., Internet2. The emerging Internet projects address the creation of a leading edge network for a new generation of applications that fully exploit the capabilities of broadband networks. Very high bandwidth and bandwidth reservation will allow materials such as continuous digital video and audio to move from research use to much broader use and include images, audio, and video in a way currently not possible. In such a widely distributed environment, accountable, efficient, and self-regulated management of resources will be desirable and most importantly, necessary.

The driving force behind the movement of Internet to the next generation is the commercialization of rich multimedia content. Digital library collections produced by corporations, entertainment material created by movie studios, and interactive instructional presentations developed by universities are soon to be available over the Internet, thus creating a new and broad source of revenue.

The emerging Internet relies on the bandwidth, which is on the order of several magnitudes larger than current Internet provides. It also alleviates network resource management and QoS control by introducing correspondent reservation and monitoring mechanisms. However, it is clear, that to date, mechanisms for the collective management of multiple media connections that efficiently leverage the sharing of resources across multiple servers in a wide area network are not found.

There is envisioned three major conditions for successful commercialization of those newly arising applications: first, mechanisms need be provided to allow paying users to establish a contract with service providers to reserve required infrastructure components and resources at a mutually agreed price for which providers establish and support a guaranteed quality of service; second, the resources supply would have to be sufficient to meet random changes of the demand, which may be completely unpredictable during architectural studies; and, third, service providers should safely rely on the system for effective security, rights and royalties management, accounting and billing for the consumption of dynamically re-configurable distributed virtual resources.

The current focus of resource management in the today's Internet, if any, relates to the setup and management of individual and independent media connections to server resources. However, the danger of this approach becomes clear when the presentations reuse multiple primary sources of content. To enforce the necessary quality as well as to control the usage and distribution when reusing multiple sources of content, two approaches are possible. One approach is to copy all content onto a single server (or a cluster of servers) during authoring, and replicating, as necessary, the final result to as many servers according to predicted demand. Primary content providers would then establish copyright charges, based on a priori market analysis. On the positive side, the control of distribution, security, and billing functions become much easier, than in case of distributed content. On the negative, if the demand is estimated incorrectly, the profit is not maximized for either primary or secondary (i.e., reuse) content providers. Finally, the most dangerous problem is that this approach leads to over-engineering of resources while it does not prevent dropout of excessive requests. Such an approach is typical for today's Internet, because current multimedia content is generally not memory hungry, as compared with emerging multimedia applications.

Another approach would be to reassemble content on a need basis, for both authoring and dissemination. It would allow content to be stored once, but used as many times as necessary, establish charges proportionally to content and resources usage, and alleviate storage demand. However, it requires a system to dynamically manage multiple and frequently heterogeneous resources. In addition, this approach exacerbates security, and resource engineering. A demand for the particular segment can not be predicted at all, because this segment may be used in completely different, even orthogonal applications. Now, if the demand for a single segment can not be met, multiple applications are affected. The latter approach, however, is the only sensible way to be used by future Internet, because from the resource point of view, it is the most economical, and serving a maximum number of users.

Thus, it would be highly desirable to provide a system and method that allows all three major commercialization conditions to be satisfied.

There are a number of publications and patents in the area of QoS-driven resource management. The most of the work has been focused on either the network, as described in U.S. Pat. No. 5,388,097 issued Feb. 7, 1995 to Baugher, M. J. et al., and entitled "System and Method for Bandwidth Reservation for Multimedia Traffic in Communication Networks," and U.S. Pat. No. 5,581,703 issued Dec. 3, 1996 to Baugher, M. J. et al, and entitled "Method and Apparatus for Reserving System Resources to assure Quality of Service"; or, the operating system, such as described in the reference "An Architecture Towards Efficient Os Support for Distributed Multimedia", Proceedings of IS&T/SPIE Multimedia Computing and Networking Conference '96, San Jose, Calif., January 1996 by David K. Y. Yau and Simon S. Lam. With the proliferation of multimedia services on Internet, it was soon realized that while IP networks were able to provide a simple, best-effort delivery service, the IP protocol is not suited for use with new real-time applications, such as multimedia streaming, Virtual Reality applications, distributed supercomputing. As a result, new network protocols, such as Resource Reservation Setup Protocol (RSVP) (See, e.g., "The Grid: Blueprint for a New Computing Infrastructure," Edited by Ian Foster and Carl Kesselman, Chapter 19, pp. 379–503, Morgan Kauffman Publishers, 1999); Real Time Transport Protocol (RTP); Real Time Transport Control Protocol (RTCP) and others, were developed (See, e.g., William Stallings, "High-Speed Networks: TCP/IP and ATM Design Principles", Prentice Hall, 1997; and, I. Busse, B. Deffner, and H. Schulzrinne, "Dynamic QoS Control of Multimedia Applications based on RTP", Computer Communications, January 1996), enabling applications to request and negotiate network QoS parameters, such as bandwidth and latency. Deployment of those protocols on the current Internet has not been successful, firstly because it required upgrading all the non-RSVP routers and servers system software. Secondly, even if RSVP were deployed on the current Internet, very limited bandwidth and computing resources would still have been the bottleneck for successful deployment of real-time applications. The current Internet was built on the backbone, enabling cross-country communications on relatively unclogged T3 (45 megabit per second). Proliferation of graphic pages, and streaming audio and video applications depleted those resources quite fast. Even worse, the rate of user's population growth is considerably higher than newly build network resources.

The National Science Foundation and MCI Corporation, responding to the emerging needs of Internet community has been building a new network, called vBNS (very-high-performance Backbone Network Service). This nationwide network also provides a backbone for the two foundations, university-led effort called Internet 2 and by federal research agencies, called New Generation Internet. The vBNS allows most of the connected institutions to run at 622 million bits per second (OC12). By the year 2000, vBNS is expected to operate at 2.4 gigabits per second (2,400 megabits per second) by the year 2000.

The vBNS system exploits RSVP protocol to support two distinct classes of services: a Reserved Bandwidth Service, i.e. a service with bandwidth commitment, and a traditional best-effort IP service (See, e.g., Chuck Song, Laura Cunningham and Rick Wilder, "Quality of Service Development in the vBNS", MCI Communications Corporation, provided at the URL http://www.vbns.net/presentations/papers/QoSDev/ieeeqos.htm. Still, resource management at the network layer for vBNS is done separately from operating system layer and in isolation from application needs and availability of the end-resources, such as storage and computing resources.

A new breed of high performance applications such as remote surgery, robotics, tele-instrumentation, automated crisis response, digital libraries of satellite data, distance learning via multimedia supported Web sites, enhanced audio, and video, is emerging. However, to accommodate such high performance applications and their continuous media flows, it is not enough to increase or reserve network capacity. These new applications require end-to-end resource reservation and admission control, followed by co-ordination of distributed functions such as: (a) resource scheduling (e.g., CPU, disk, etc.) at the end-system(s), (b) packet scheduling and flow control in the network, and (c) monitoring of the delivered end-to-end quality of service. It is essential that quality of service is configurable, predictable and maintainable system-wide, including the end-system devices, communications subsystem, and networks. Furthermore, all end-to-end elements of distributed systems architecture must work in unison to achieve the desired application level behavior.

Up do date, there has been considerable effort in the development of end-to-end quality of service support. Among them are Heidelberg QoS Model, developed within HeiProject at IBM's European Networking Center and described in the reference entitled "HeiRAT—Quality of Service Management for Distributed Multimedia Systems", Multimedia Systems Journal, 1996 by Volg, C., Wolf, L., Herrtwich, R. And H. Wittig; an Extended Integrated Reference Model (XRM), developed by COMET group at Columbia University such as described in the reference entitled "Building Open Programmable Multimedia Networks", Computer Communications Journal, Vol. 21, No. 8, pp. 758–770, June 1998 by Campbell, A. T., Lazar, A. A., Schulzrinne, H. And R. Stadler; OMEGA end-point architecture, developed as the interdisciplinary research effort in the University of Pennsylvania such as described in the reference entitled "Design, Implementation and Experiences of the OMEGA End-Point Architecture", Technical Report (MS-CIS-95-22), University of Pennsylvania, May 1995 by Nahrstedt K. And J. Smith; in-serv Architecture which is a contribution of the Internet Engineering Task Force (IETF) such as described in the reference entitled "A Framework for End-to-End QoS Combining RSVP/Intserv and Differentiated Services," Internet Draft, IETF, March 1998 by Bernet Y, et al.; the Quality of Service Architecture QoS-A, developed by A. Campbell, and presenting an integrated framework dealing with end-to-end QoS requirements such as described in the reference entitled "A Quality of Service Architecture", PhD thesis, Lancaster University, January 1996 by Andrew T Campbell. Another reference which analyzes the above mentioned QoS paper is entitled "A Survey of QoS Architectures", ACM/Springer Verlag, Multimedia Systems Journal, Special Issue on QoS Architecture, Vol. 6, No. 3, pp. 138–151, May 1998 by Aurrecoechea, C., Campbell, A. T. and L. Hauw.

Substantial work has been done by SRI International, developing an End-to-End Resource Management of Distributed Systems (ERDoS), which enables adaptive, end-to-end, scalable resource management of distributed systems such as described in the reference ERDOS QoS Architecture, Technical Report, SRI International, May 1998. An extensible Resource Specification Language (RSL) and the resource management architecture has been implemented within Globus meta-computing toolkit, and used to implement a variety of different resource management strategies such as described in Czajkowski, K., et al., "A Resource Management Architecture for Metacomputing Systems" Proc. IPPS/SPDP '98 Workshop on Job Scheduling Strategies for Parallel Processing, 1998; and Foster, I., Kesselman, C., "The Globus Product: A Status Report" Proc. IPPS/SPDP '98 Heterogeneous Computing Workshop, pp. 4–18, 1998.

While the architectures described in the above-mentioned references are directed resource reservation and management of end-to-end resources, they generally assume a single, even geographically limited network subsystem which provides bounds on delay, errors and meet bandwidth demands, and an operating system which is capable of providing run time QoS guarantees. However, the next generation Internet must be viewed not as only a network of networks, but first and foremost a system of distributed systems. In this paradigm, not only the communication resources, but also the computing and storage servers are shared among many users.

Thus, the architectures mentioned above do not provide a coordinated management of overall system resources as a function of request activities for individual content and computing resources. Consequently, quality of service must be degraded in response to growing volume of requests for such services over and above an established limit. As the above-mentioned architectures focus on providing QoS as requested by application, they do not take an advantage of a possible aggregation of resources due to commonality between user requests for a particular service. For example, it would be desirable to determine commonality for the usage history of a particular multimedia content, e.g., bursts of requests within short time intervals, the proximity of origination addresses of requests, etc. In addition, the architectures described above do not allow for dynamic monitoring and recording of resource consumption for individual services as well as for groups of related services, with the purpose of calculating cost of service for individual clients.

Thus, it would be highly desirable to provide a mechanism capable of providing an adaptive resource management function for distributed resources that is suited for the next generation of Internet.

SUMMARY OF THE INVENTION

It is an object of the present invention to provide a system and method for managing multimedia content and server-side resources that exploits the unique characteristics of future computer networked environments.

Particularly, it is an object of the invention to provide a system and method for managing and controlling the distribution, sharing and pooling of resources in an Internet/World Wide Web environment in such a manner that is beneficial, accountable, and seamless to the users who are requesting access to multimedia content.

It is a further objective of the invention to provide a resource management system that self-regulates, according to policies, a plurality of end resources and server-based capabilities.

The present invention is directed to a self-regulated distributed network of system resources, i.e., a "resource of resources". Particularly, a distributed system referred to as a Service Control Plane (SCP) performs self-regulating management of distributed resources comprising: a plurality of end resources such as (but not limited to) servers and databases providing access to (multimedia) content and services, a plurality of clients requiring access to content and services, and a plurality of system resources connected by a computer networking environment.

According to the principles of the invention, the service control plane is an intelligent intermediary decision plane for managing and enforcing end-to-end properties in the availability of end resources in a computer networked environment. The service control plane receives stimuli (i.e., application requests) from a plurality of clients desiring to access target multimedia content, for instance, and responds to these with end-to-end mapping recommendations satisfying one or more properties (policies) set in the service control plane. When a client accepts a mapping recommendation, the service control plane guarantees its performance as set forth by the policies used to generate it.

The SCP essentially provides the control and management of the server-side (end) resources which may be characterized as global, i.e., resources dynamically (on-demand) allocated by the system and having a lifetime determined by the system; and local, i.e., resources pre-allocated and presented to the system as possessing a lifetime that is independent of the system. As in any distributed object scheme, the local resource is a resource that is associated and maintained by its originating private provider. A global resource represents an on-demand created resource that is made available at one or more global system providers.

Particularly, the system administrators control the placement of object replicas onto global resources, as well as the ratio of global to local resources for each particular server. The placement of replicas, and ratio of global to local resources may be constant, or changed based on preferences of content owners or service provider.

Global resources may be made available as a function of integrated demand from clients. To satisfy the requests of clients requesting access to target content, global server-side resources are allocated. A plurality of intermediary system resources (such as directories and resource monitors) enable the management of such requests for target content in a process referred to as mapping, brokering and negotiation.

According to one aspect of the disclosure, the capacity of global resources is dynamic and performed when deemed necessary based on the analysis of utilization patterns of target content and replicas by pluralities of clients. The system dynamically shapes capacity by (a) controlling the number of replicas associated with an object and (b) the placement of these replicas.

According to another aspect of the invention, the SCP additionally controls the mapping of the client requests. Particularly, methods are provided to dynamically shape demand for an object based on criteria such as arrival time, incoming geography, and costs requirements. In particular, the present invention characterizes future demand for an object based on aggregation and forecasting of past demand for such object. This aspect of the invention is described in conjunction with the capacity shaping mechanism. The SCP coordinates the dynamic placement of replicas of target content across global resources.

Still another aspect of the invention relates to management of the end-resources. A skilled artisan will appreciate that today resource management is not feasible in part because interfaces to end systems are closed and proprietary. According to the system and method of the invention, interfaces and mechanisms are provided that facilitate resource monitoring, setup, and management.

To make such resource management a possibility, the SCP allows an end-resource to be both globally and locally managed with global components managed by the system, and local components self-managed by the resource.

Herein a resource is referred to as a server-based capability. In the present invention, a server is represented in terms of capabilities which represents a heterogeneous media unit streaming capacity. Each capability may be assigned to local or global management, with the service control plane permitting the management of global capabilities while the server itself manages local capabilities. A server administrator allocates the ratio of global and local capabilities at a server. Resource capabilities need not be uniform. However, capabilities need to be normalized and consequently, the resource is viewed as a set of storage and service bins that represent capabilities for provisioning content. A service bin models capabilities in a resource and comprises one slot for each different capability tuple. A server manages a storage bin which is used for each content. Content is associated with capabilities via the binding of a storage bin with a service bin. However, because not all content is identical, it is necessary to obtain a worst resource bound for content. Each server is assigned content that is local and/or replicated. Replicated content is globally maintained while local content is referred to as original content.

Binding a storage bin to a service bin forms a streaming connection—the binding being evaluated at a quality of service. The service bin is associated with resource requirements needed to stream content in such resolution. Each content is associated with a resource profile. For constant bit rate, this is possible in terms of bandwidth at the expense of computation. For variable bit rate, it is necessary to obtain a performance envelope for the worst case. The resource profile is used to facilitate the evaluation of the binding.

Advantageously, the system and method of the invention provides important enhancements to resource management architectures not yet available today: 1) it provides a highly available distributed decision capability that may be used to achieve and enforce properties over the usage, as well as patterns of usage, of end-resources; 2) it creates a resource monitoring point with respect to the performance of multiple end resources and clients and their usage patterns so as to provide parameters on where, when, and how to satisfy a request; and 3) it provides an insertion point that can be used for dynamic insertion of both resources and content in a manner transparent to clients.

BRIEF DESCRIPTION OF THE DRAWINGS

Further features, aspects and advantages of the apparatus and methods of the present invention will become better understood with regard to the following description, appended claims, and accompanying drawings where:

FIG. 7($a$) illustrates an example replica directory (666) including schema and data associated with the replica directory.

FIG. 7($b$) illustrates an example server directory (656) including schema and data associated with the server directory.

DETAILED DESCRIPTION OF THE PREFERRED EMBODIMENT

Figure 1:
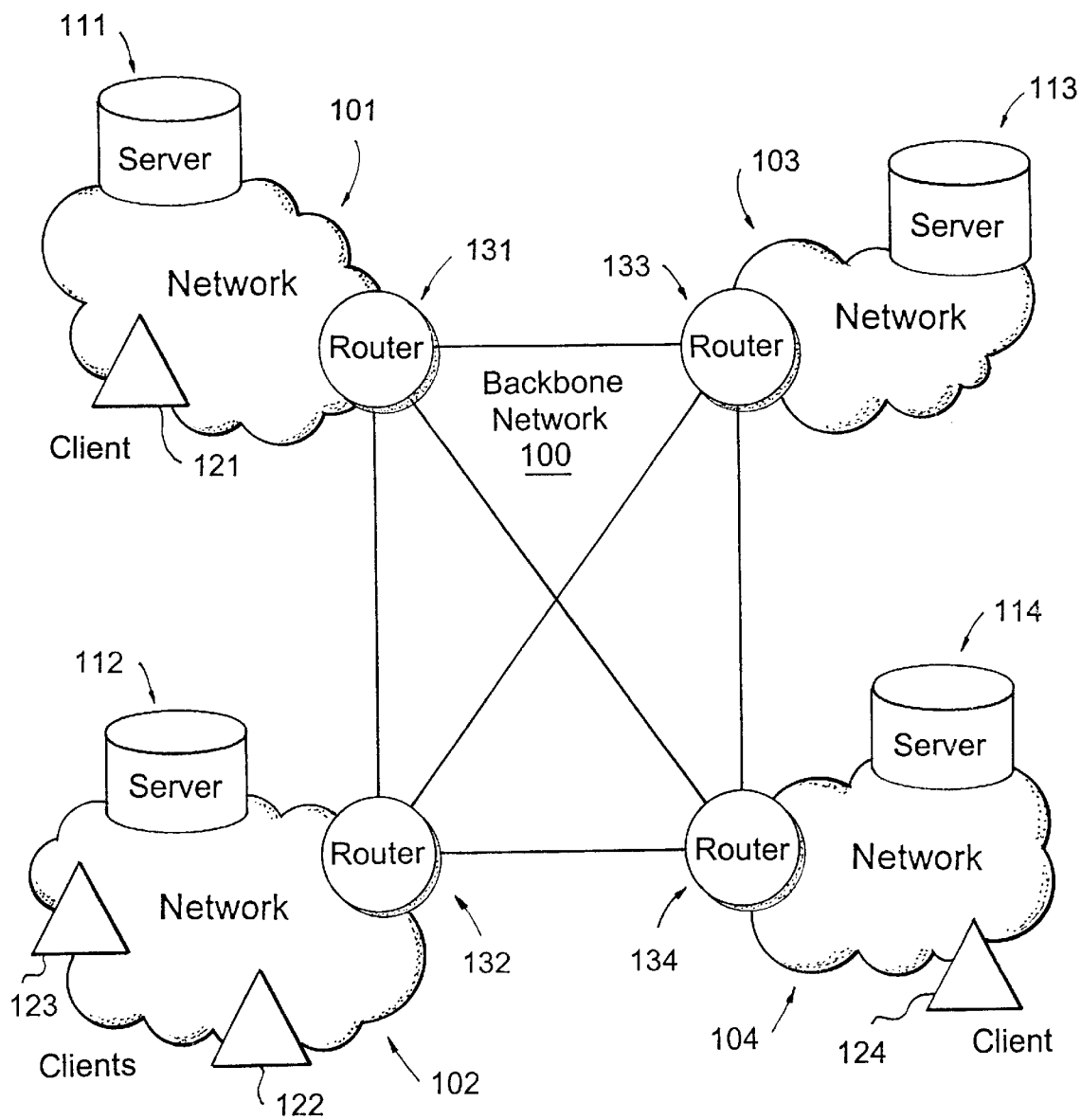
FIG. 1 illustrates the current Internet as comprising a plurality of local networks interconnecting subsets of servers, and subsets of clients.
Figure 2:
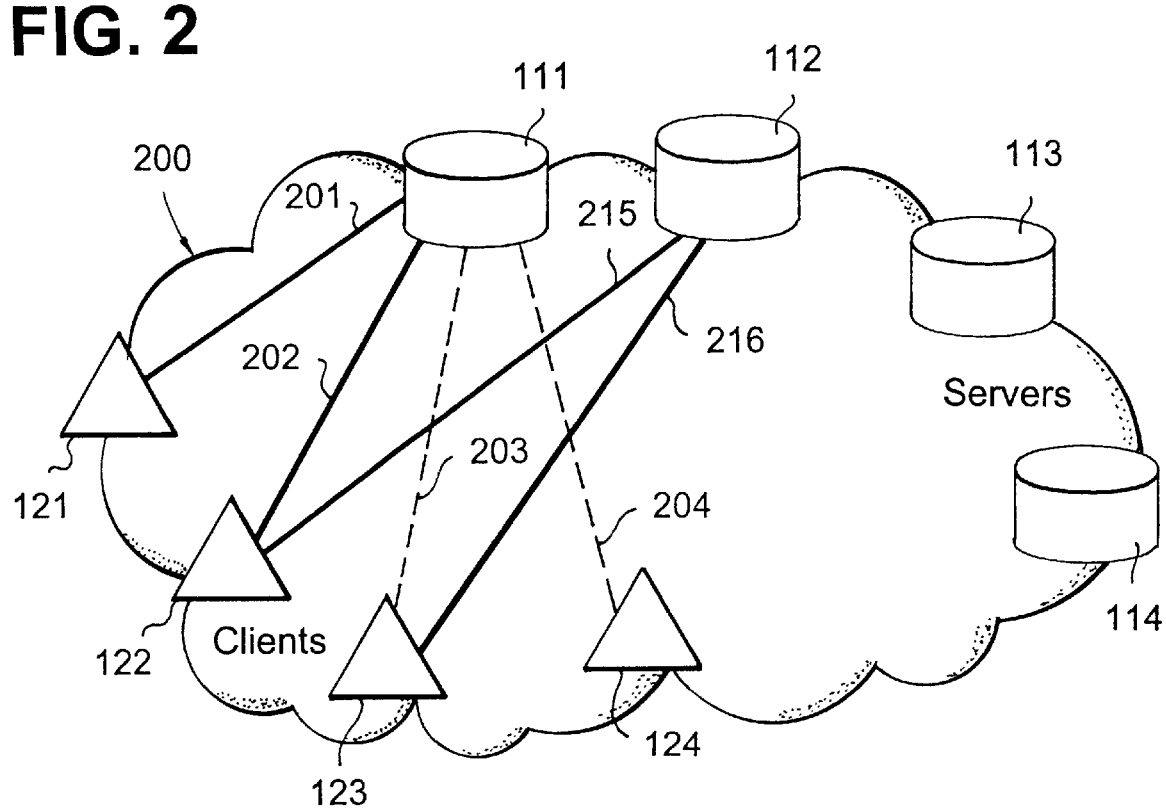
FIG. 2 is an illustration depicting a single virtual network for interconnecting all the clients and servers of FIG. 1.

FIG. 1 is a depiction of the current Internet as comprising a plurality of local networks (101, 102, etc.) interconnecting subsets of servers, (e.g. 111, 112, etc.) and subsets of clients, (e.g. 122, 123, etc.), usually positioned in local proximity from those servers. In turn, local networks are connected via routers (e.g. 131, 132, etc.), to a backbone network 100. As a result, all clients and servers are interconnected into a set, where, abstracting of the security issues, all the clients may share all the servers. FIG. 2 is an illustration depicting a single virtual network 200 interconnecting all the clients (121, 122, 123 and 124) and servers (111, 112, 113, and 114). For exemplary purposes herein, the network (200) backbone resources and its characteristics, such as bandwidth, latency, etc., are explicitly regulated by an RSVP network, such as vBNS, (not shown) used by the Internet2 or New Generation Internet (NGI).

The network resources, dedicated to any end system, like a specific client or server, are limited and may vary. For example, resources may provide extra computing power, such as supercomputing arrays, real-time encoders, such as encryption engines, etc., however, for exemplary purposes herein, resources include those associated with multimedia content servers. It is understood that the solutions provided herein may be applicable to any kind of resource. Additionally, end-system resources may be heterogeneous, using different operating systems, architecture, processors, memory bandwidth, storage, etc. It is assumed that the client resources are sufficient for running single user applications, e.g. media streaming. Such clients may share server resources. For example, as shown in FIG. 2, clients (122) and (123) request server (112) to produce an individual stream (215) and (216), respectively, for each of them, and clients (121) and (122) share server (111) by. requesting streaming connections (201) and (202), respectively. It clients (123) and (124) desire to request content from the server (111) (via dotted lines 203 and 204, respectively) such requests may be declined, if the server (111) does not have enough of a specific resource, or a combination of resources. In the same time, server (113) and (114) may be temporary under used, having an additional resource to satisfy requests from clients (123) and (124), but owning no correspondent content. If this content is replicated from the server (111) to servers (113), and (114), then requesting clients (123) and (124) may be re-addressed to servers (113) or (and) (114). However, two scenarios may govern this:

First, assuming that the requested content already exists on the servers (113) and (114), the system of the invention enables tracking of the "hot" content and where it is located. In this case, the system automatically re-addresses client requests to other servers with the same "hot" content, but having sufficient resources and willingness to accept those requests.

Figure 3:
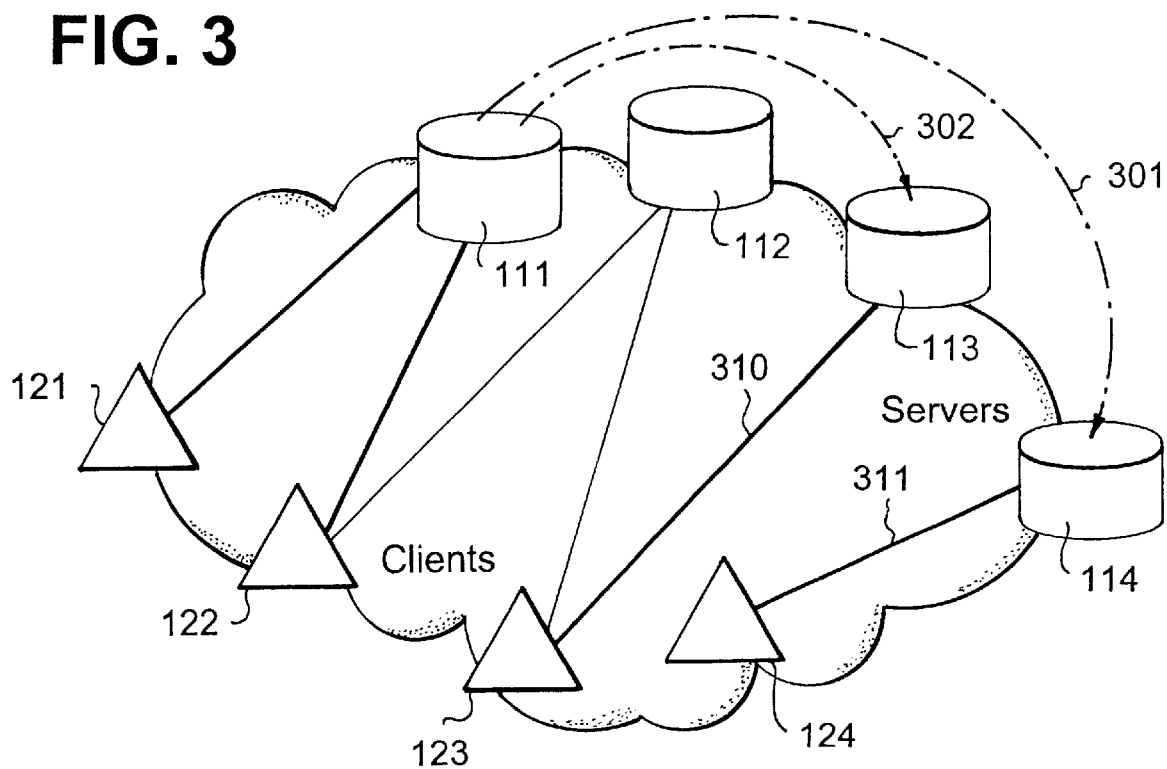
FIG. 3 is an illustration depicting the provision of replicating links from a server (111) to servers (113) and (114), which must be initiated in advance, to provide continued support of growing demand for objects in the virtual network of FIG. 2.

Second, if there are no more sufficient available resources on all the servers managed by the system, the requested content may be replicated from the server (111) to the servers (113) and (114) and made available to clients (123) and (124) via respective links (310) and (311), as shown in FIG. 3. As media content may be quite large, for example 1 hour MPEG-2 stream requires on the order of t>1 Gbytes of storage, the replication may take time substantially longer than clients (123) and (124) agree to wait. Hence, as shown in FIG. 3, the replicating links (301) and (302) must be initiated in advance, to continue the support of all the growing demand during the time interval that is sufficient for the replication of this particular content.

Figure 4:
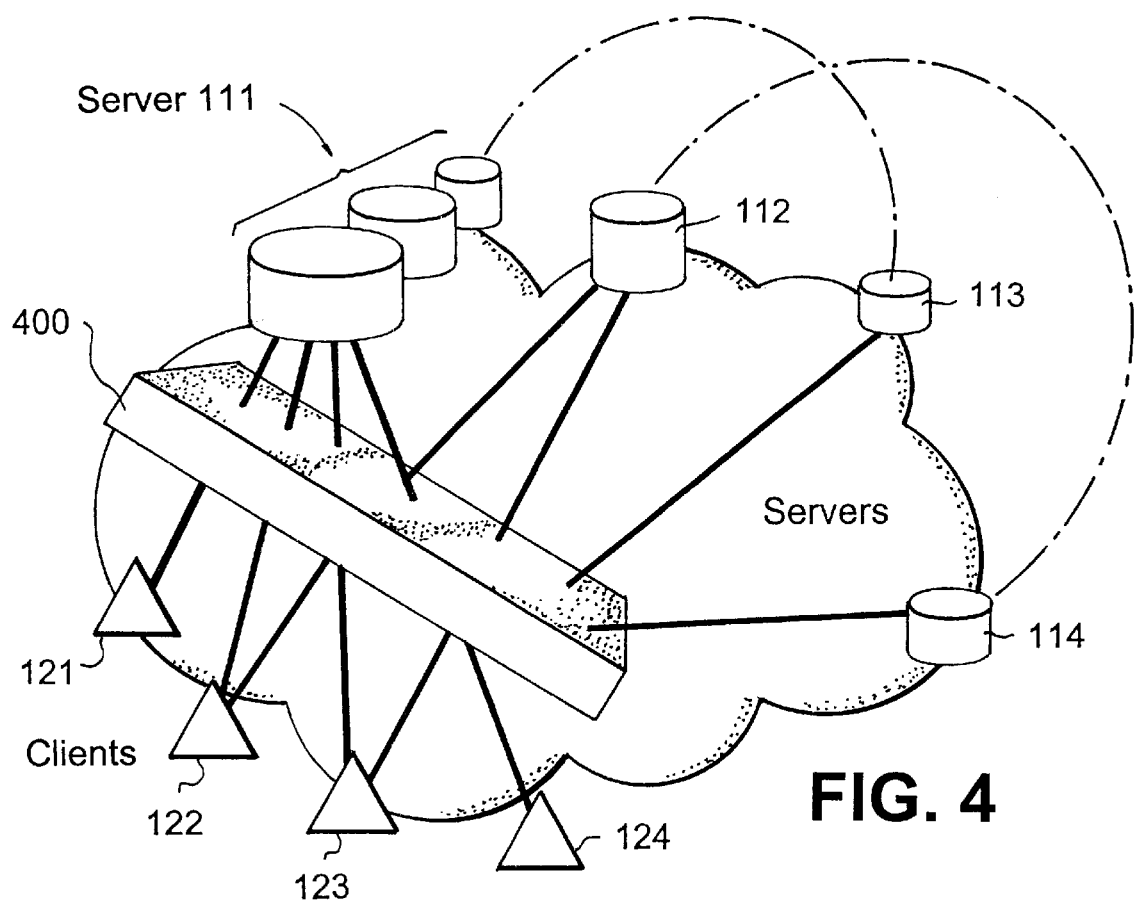
FIG. 4 illustrates the provision of a Service Control Plane middleware (400) according to the invention that is located between the clients and the server resources of the virtual network of FIG. 2.

The contemporary Internet streaming applications establish individual flow between a client and a server, taking care of the QoS, security, encoding and all other issues on per-flow basis. In order to provide means to intervene into this process, a Service Control Plane (SCP) middleware is provided such as shown in FIG. 4. The SCP (400) is located between the clients (121, . . . ,124) and the server resources (111, . . . ,114), interrupts client requests, finds their rate, density and proximity, determines what content is "hot" and predicts the distribution of the requests for such "hot" content. On the other hand, the SCP (400) monitors the availability of the resources, maps the requests to the servers with available resources, predicts utilization of the end-resources and if necessary, dynamically re-distributes the content. Because the SCP enables borrowing of under used resources from servers (113) and (114) for increasing the resources of the server (111), for example, the resources at the server 111 grow sufficiently and on-time to satisfy expeditiously all the requests to the content on this server. The SCP also enables returning resources back to the lending servers when the rate of requests decreases.

Figure 5:
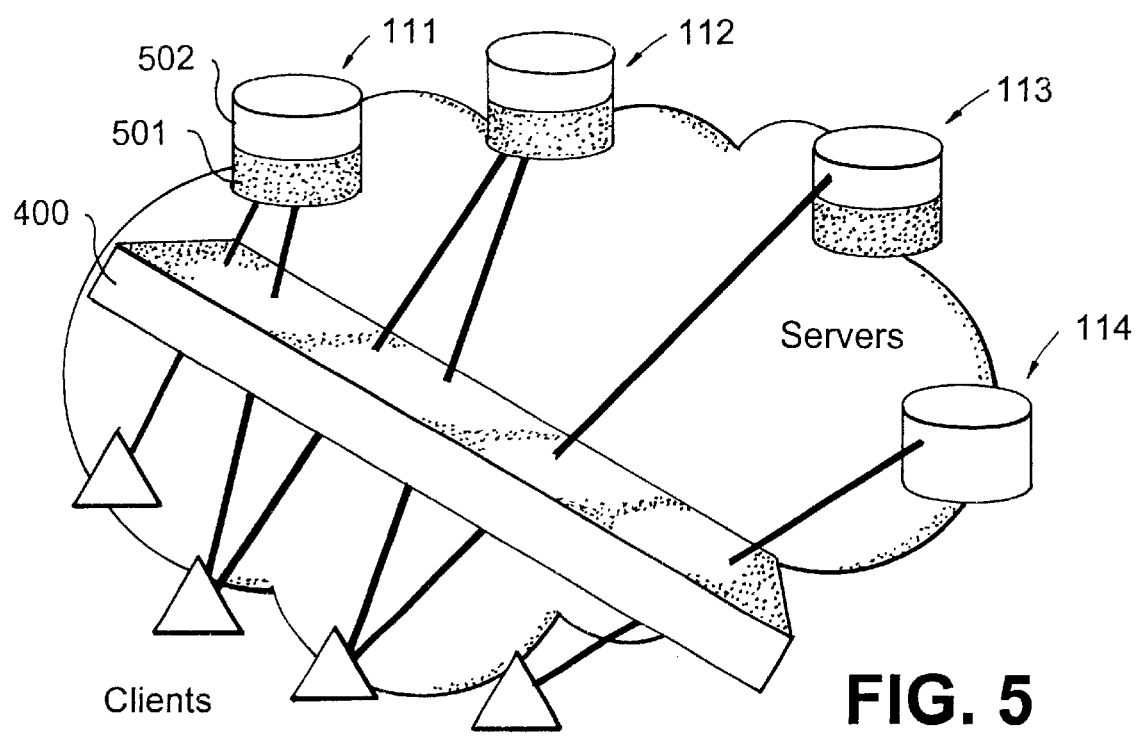
FIG. 5 illustrates servers (111, 112 and 113) as comprising both local resource storage shaded in dark-gray (501) and the global resource storage as shaded as light gray (502).

The invention classifies server resources, which are available for borrowing, as global, and other resources as local. Local resources are those resources that are persistent, i.e., the content using the local resources is not changed dynamically by the system, but only by way of system administrators. Global resources are those resources that are used to dynamically replicate the content, in order to accommodate the overall volume of requests, or demand. For example, FIG. 5 illustrates servers (111, 112 and 113) as comprising both local resource storage shaded in dark-gray (501) and the global resource storage as shaded as light gray (502). It is understood that system administrators are empowered to designate the ratio of global resource to local resource at a server. For example, in FIG. 5, the server (114) is configured as completely global, while other servers (111, 112 and 113) are partially global, and partially local.

According to the preferred embodiment of the invention, the SCP (400) has three major functions: 1) it controls and shapes the distribution and placement of requests onto servers; 2) it controls and shapes the distribution and placement of replicas across servers according to some set criteria; and, 3) it is responsible for dynamically creating, destroying, and moving replicas across servers as deemed necessary.

Figure 6:
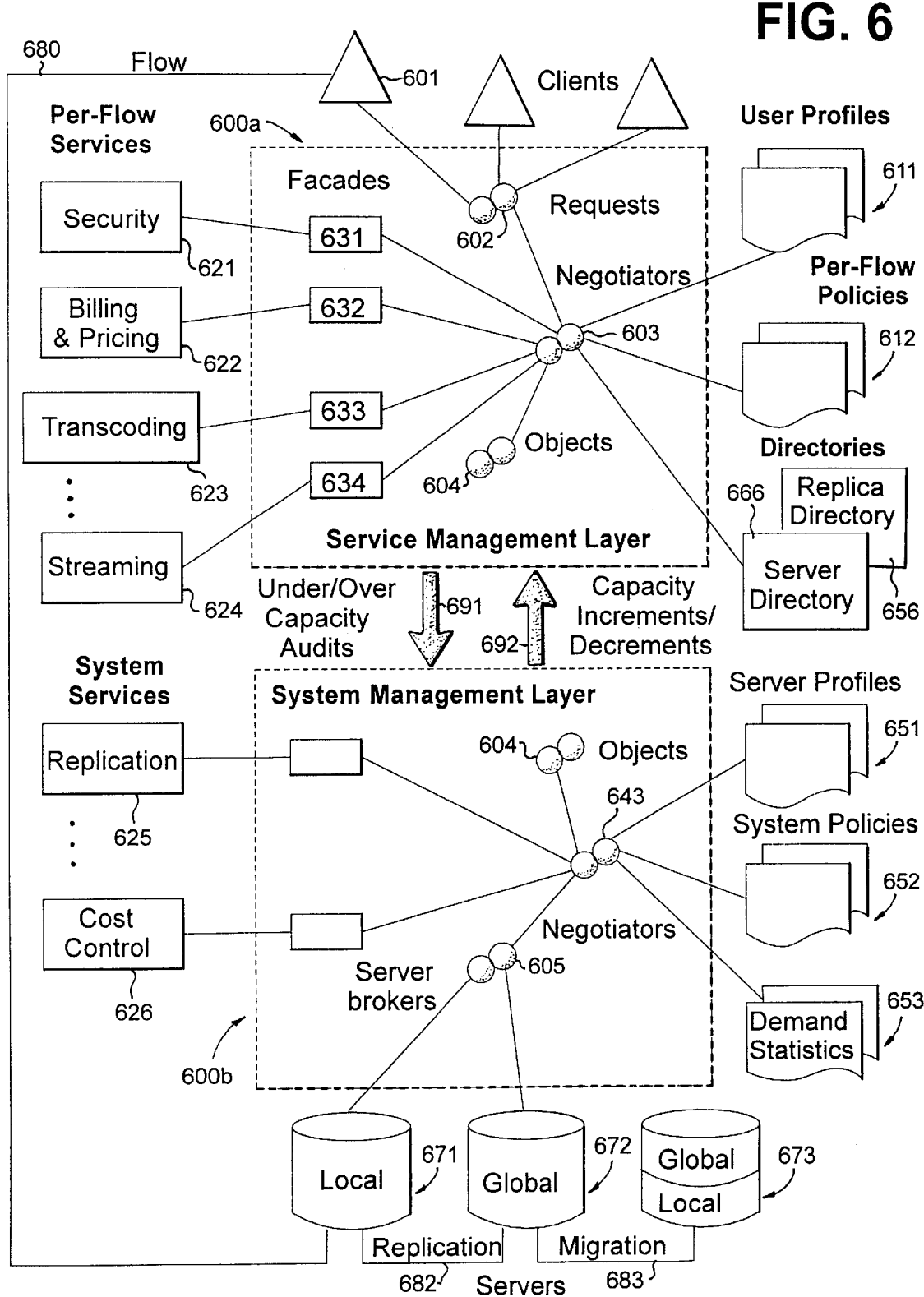
FIG. 6 illustrates the SCP (400) as comprising two layers: a Service Management Layer and a System Management Layer according to the invention.

FIG. 6 illustrates the SCP (400) as essentially comprising two layers: a Service Management Layer (600*a*) and a System Management Layer (600*b*). Both layers enable a mapping transitivity of a received client request to an object replica, but constitute separate services.

Specifically, the Service Management Layer (600*a*) provides management of the per-flow connection by receiving requests for objects and mapping those requests to the particular server(s) based on factors such as: aggregated demand statistics, and willingness of the servers to provide the requested services. A more detailed description of this aspect of the invention is provided in commonly-owned, co-pending U.S. patent application Ser. No. 09/335,272, entitled SYSTEM AND METHOD FOR INTEGRATED LOAD DISTRIBUTION AND RESOURCE MANAGEMENT IN AN INTERNET ENVIRONMENT, now U.S. Pat. No. 6,463,454 the whole contents and disclosure of which is incorporated by reference as if fully set forth herein. The Service Management Layer (600*a*) further provides a mapping of a request to the object, taking in consideration various parameters, such as user preferences embodied by user policies (611), client parameters, and also per-flow policies embodied as policies (612), such as a policy for service delivery, including availability, quality, interactivity level, etc.

The System Management Layer (600*b*) provides an aggregated demand and capacity management and control by attempting to match predicted demand for web objects to available capacity on web servers by dynamically shaping both demand and capacity based on some criteria established by the system policies (652). Those policies define set criteria for exploration of the willingness of the servers to provide services, negotiation policy between overall demand and placement of replicas, etc. Further details regarding the capacity shaping aspect of the invention may be found in commonly-owned, co-pending U.S. patent application Ser. No. 09/335,273, entitled SYSTEM AND METHOD FOR CAPACITY SHAPING IN AN INTERNET ENVIRONMENT, now U.S. Pat. No. 6,466,980 the whole contents and disclosure of which is incorporated by reference as if fully set forth herein.

As shown on FIG. 6, a client (601) instantiates a request (602), which in turn invokes a negotiator object (603) for locating and negotiating the request with the service object (604), e.g., streaming content.

As described in aforementioned herein incorporated co-pending U.S. patent application Ser. No. 09/335,272 now U.S. Pat. No. 6,463,454, the negotiations are based on user profiles, per-flow policies, and server and replica directories. User profiles (611) characterize the client resources, such as processing power, memory, available bandwidth, etc., and exemplify user preferences, such as preferable compression, cost limits, interactivity level, e.g., the possibility to control the flow of content in time, previewing set-up, willingness to accept or reject commercial advertisement, etc. The negotiator object (603) uses tentative placements, derived from both a replica directory service (666) (see FIG. 7(*a*)) and a server directory service (656) (see FIG. 7(*b*)), and executes a query strategy to query the servers associated with those tentative placements. The resulting placement is provided according to the exploration and negotiation per-flow policies. Exploration policy defines the query strategy, e.g. how many servers should be queried in parallel. The negotiation policy is used to refine multiple tentative placements and enable choosing of a placement based on criteria including: server resource availability, e.g., a server having a willingness "green" factor, and server capacity, e.g., a server having a "high" available capacity. The combination of these two criteria makes the risk of service rejection minimal over time, and facilitates the overall load balancing, than in case of placement to a "red" and low capacity server. Per-flow policies allow customizing placement, and could either be loaded during initialization, or on-demand.

As mentioned, negotiations involve optional per-flow services, including, but not limited to: a security service (621), a billing and pricing service (622), a transcoding service (623), and a streaming service (624). For instance, the security services (621) may be added to provide user authentication and authorization as well as encryption/decryption of data. The pricing service (622) enables media services to be offered at various costs and permit a wide variety of pricing policies. The billing service (622) allows the cost of the service to be charged to the service user. The transcoding service (623) may request a real-time compression method, as requested by a profile. The streaming service (624) allows the media servers to conform to the various functions, such as a provision to publish or update media. The security service (621), billing and pricing service (622), transcoding service (623), and streaming service (624) each may plug-in to the service management layer (600*a*) via custom facades or interfaces 631, 632, 633 and 634, respectively. It should be understood that the list of services is not exhaustive, and others may be added by implementing associated facades.

Figure 8:
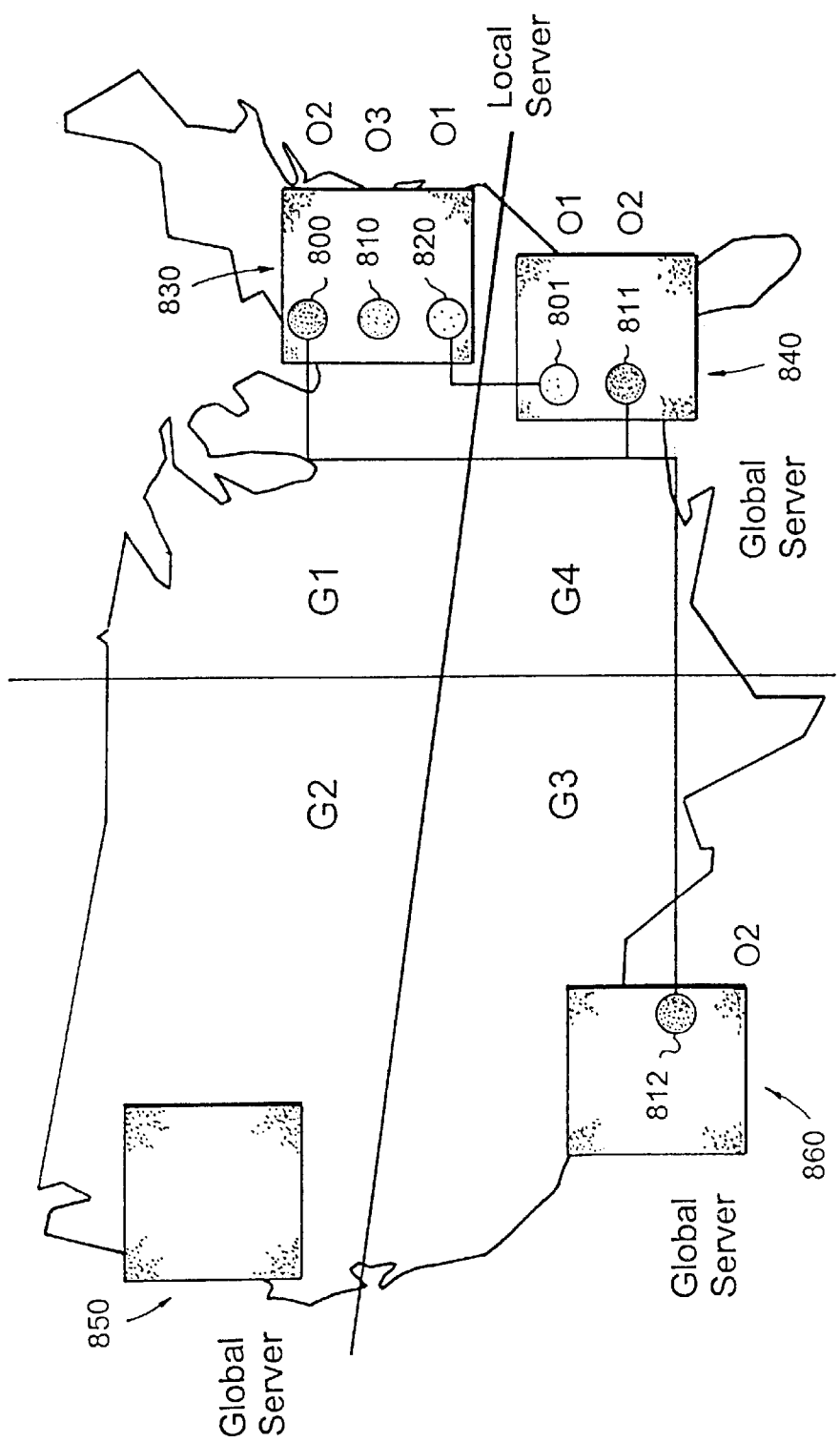
FIG. 8 illustrates the distribution of object replicas over the territory of the United States, as determined by the System Management Layer of the SCP at a particular instant of time.

Within the System Management Layer (600*b*) the service objects (604) undergo another negotiation process (643)

which is directed to generating and distributing object replicas over available servers. As shown in FIG. 6, this negotiation process takes into account aggregated demand statistics (653), selects the set of "hot", or most popular objects according to system policies (652) and server resource profiles (651). For example, FIG. 8 illustrates the distribution of object replicas over the territory of the United States, as determined by the System Management Layer (600b) at a particular instant of time.

As further shown in FIG. 6, the initial placement of replicas onto servers (671), (672) and (673) is defined by the service provider and (or) content owner, and reflected in the replica directory (666) and server directory (656). The server brokers (605) reflect the willingness of the servers to accept the service, which is monitored and controlled locally by the server itself, and reported as utilization state indicated as Red, Yellow or Green states into the server directory (656) (see FIG. 7(b)). For example, if the local server (671) holds the replica which is requested by the client (601), and the condition of the server (671) is "Green," the Service management layer may bind the client (601) and the replica on the server (671), establishing the streaming flow (680) between them. After the binding between the client and a server is established, the QoS control, interactivity control, etc., is further provided by the point-to-point application itself. However, if the per-flow QoS parameters for an individual request cannot be delivered, then the control returns back to the System Management Layer, which remaps the request to another server.

It should be understood that the number of replicas associated with a given object is variable over time and driven by predicted demand for a web object. When the Service Management Layer (600a) places the request to the System Management Layer (600b), it may be discovered that the demand analysis for the replica of the particular object and the analysis of availability of capacity may be mismatched, e.g., as a result of a decrease or increase of demand for the object replica. If the mismatch is of a degree in accordance with a set criteria, then the Service Management Layer generates an under/over capacity audits (691) such as described in co-pending U.S. patent application Ser. No. 09/335,273 now U.S. Pat. No. 6,466,980. In response, the System Management Layer initiates a comprehensive analysis, which could possibly lead to the creation and/or deletion of replica(s), effectively shaping capacity based on demand.

As further shown in FIG. 6, via server broker objects (605) which represent available servers, the negotiator objects (643) finally maps the object replica onto one or several global servers, e.g. server (672). Simultaneously, the negotiator reports the new placement of the replica to the replica directory (656) in the service management layer. The mapping of a replica may involve an initiation of replication (682), or migration (683), or deletion process. The change in replica placement is reported back to the directory (656), effectively initiating a process (692) for incrementing/decrementing capacity, i.e., adding/deleting the server address out of the replica directory (656).

Note, that optional system services, such as replication (625), or aggregated cost control (626) may be exploited by the negotiator object (643) while deciding on the destination of replica and speeding up the replication process.

Figure 9:
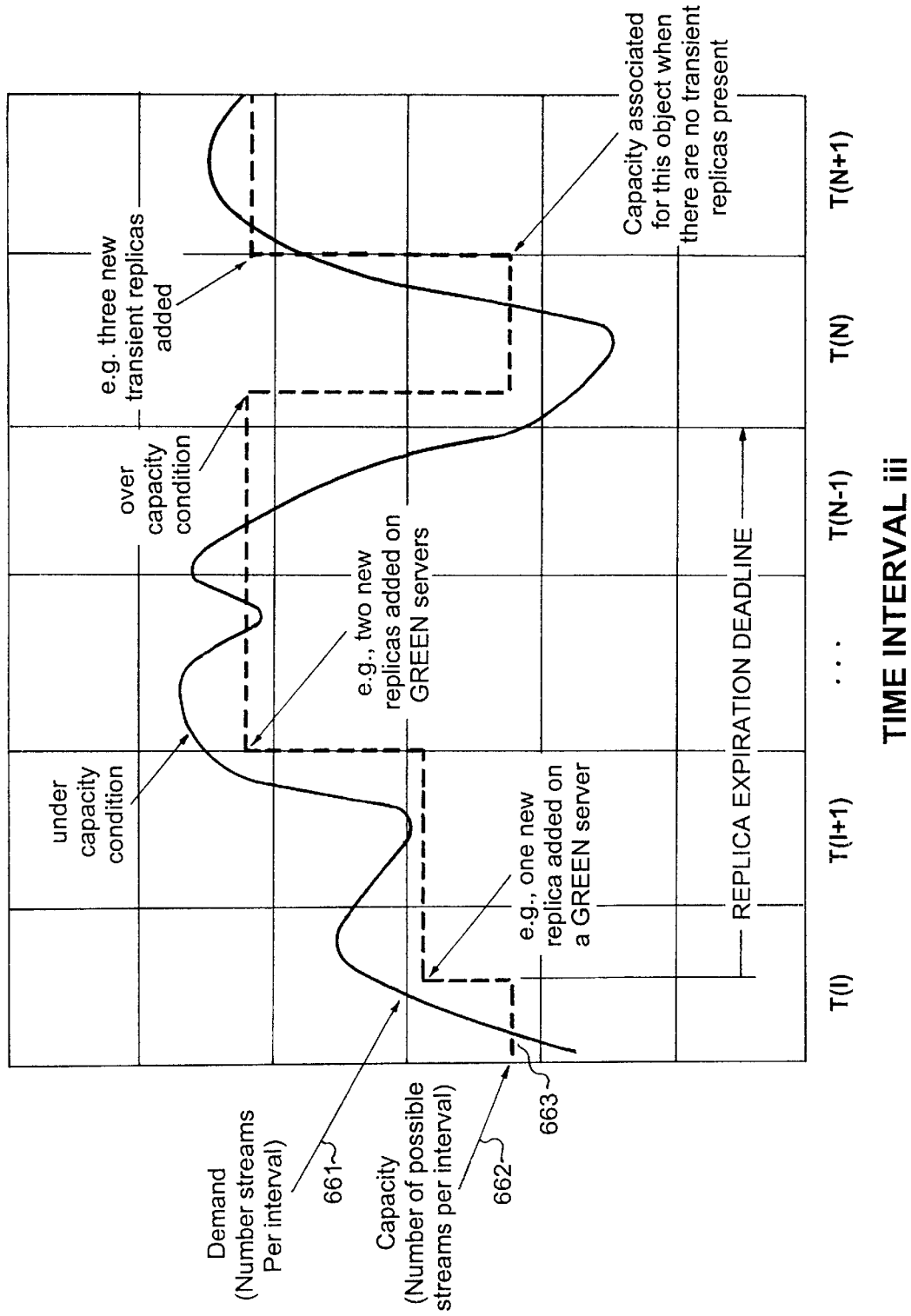
FIG. 9 illustrates a graphical depiction of the capacity shaping mechanism according to the preferred embodiment of the invention.

FIG. 9 illustrates a graphical depiction of the capacity shaping mechanism according to the preferred embodiment of the invention. Further details of the capacity shaping mechanism may be found in above-mentioned co-pending U.S. patent application Ser. No. 09/335,273 now U.S. Pat. No. 6,466,980. As shown in FIG. 9, the line (661) represents the number of request streams measured per pre-established time interval. The dotted line (662) symbolizes the number of possible streams per this interval. During the initialization process, as indicated at (663) before the time segment T(i), no transient (or global) replicas exist. However, during the T(i) interval, the demand exceeds capacity to a degree, which leads the System Management Layer (600b) to add one transient replica to one of the global servers, which has declared its willingness to accept the replica, i.e., possess a "green" indicator of resource availability. At the end of the interval T(i+1) two transient replicas are added, due to the predicted high growth in demand, which generated an under capacity condition. However, the prediction is not realized during several next time intervals, and finally the demand falls to a level which generates an over capacity condition. If the replica expiration time shown on FIG. 9 is expired at the end of the interval T(N−1), then the System Management Layer (600b) does not enable the replicas to extend their life on the related servers. As a result, all the transient replicas are destroyed, and the overall capacity will fall to the initial level. Finally, as shown in FIG. 9, the demand grows fast again, so at the end of the control interval T(N) three new transient replicas are added.

According to the invention, server resources may be subdivided into two groups of resources: storage and service resources. In order to normalize capabilities of the heterogeneous servers, the notion of storage and service bins respectively, is introduced. For example, resources required by a particular application, e.g., a streaming application, may be experimentally or theoretically evaluated by a size of storage s, required to store the content, and a tuple (m, c, b), where m , c and b symbolize memory, CPU cycle allocation (e.g., in million instructions per second (MIPS)), and bandwidth resources that are required to stream the content.

Figure 10:
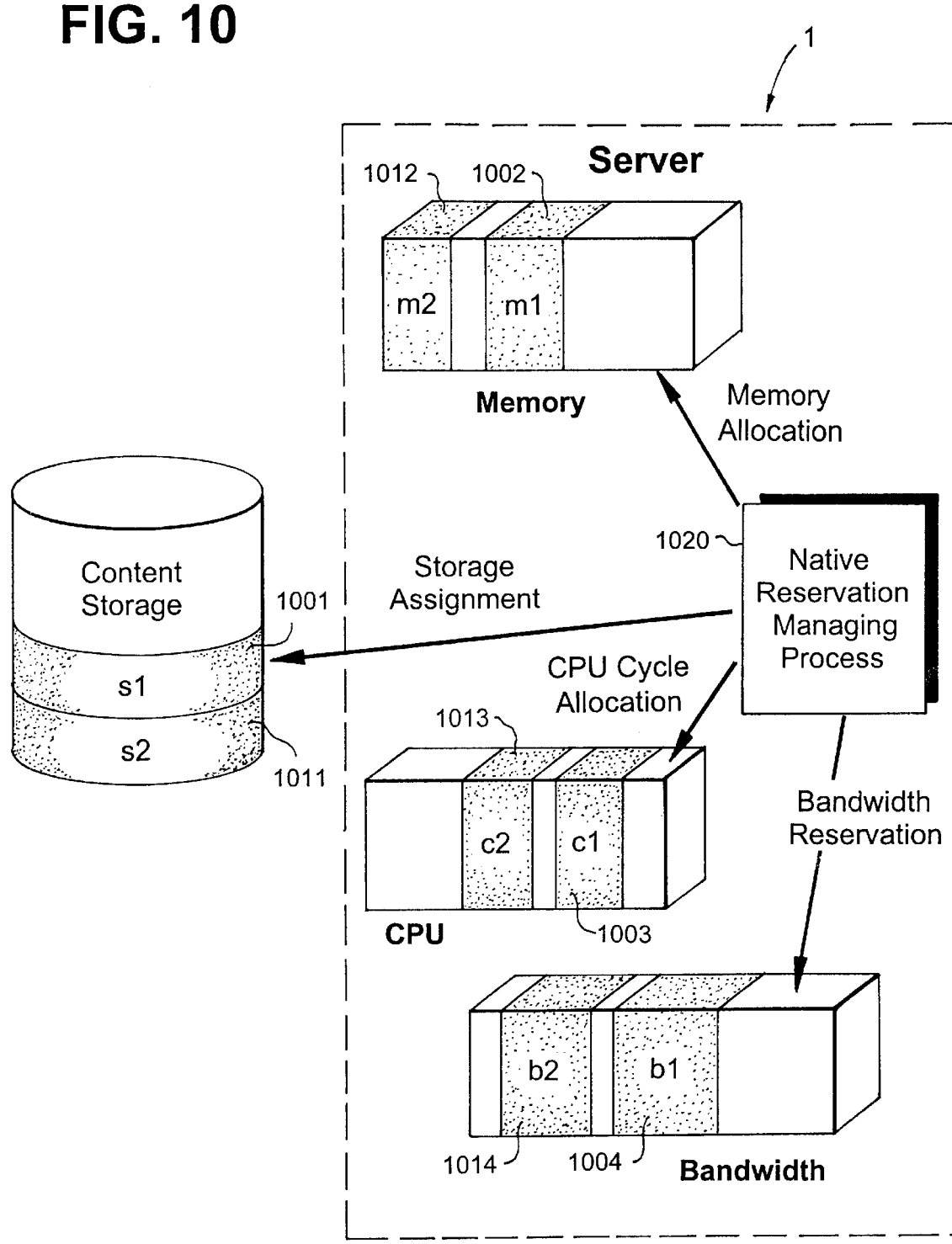
FIG. 10 is an illustration depicting the streaming of a first type of content consuming resources s1, m1, c1 and b1 and a second type of content consuming resources s2, m2, c2 and b2.

FIG. 10 illustrates streaming of MPEG-1 content, e.g., consuming resources s1 (1001), m1 (1002), c1 (1003) and b1 (1004). Streaming of another type of content, e.g., one coded in MPEG-2, may require s2 (1011), m2 (1012), c2 (1013) and b2 (1014) resources. Thus, as a convenient means of measurement of the consumption of resources by a various classes of applications, the resources are characterized as storage s and service r(m,c,b) bins. Consequently, the resource is viewed as a set of storage and service bins, which represent capabilities for provisioning services. As not all applications are identical, it is necessary to obtain a worst resource bound for content, requiring experimental measurement of different classes of applications for various servers. However, this approach allows convenient normalization and reservation of heterogeneous server resources by various classes of applications.

The relevant disclosure described in greater detail in found in commonly-owened, co-pending U.S. patent application Ser. No. 09/335,272 now U.S. Pat. No. 6,463,454 describes the method of overall resource monitoring for the case when several applications run in parallel. However, it is assumed that service bins are additive. In other words, the overall service resource consumed by several applications that are running in parallel is equivalent to a sum of resource bins required by each application. The overall storage is always a sum of storage bins, unless the applications share the same content, and therefore require a common storage bin.

A system administrator configures overall resources as local and global. The administrator is responsible for establishing the ratio of local to global resources for each server as well as to establishing policies of "green" "yellow" and "red" load limits for those resources. After configuring a partition as global storage, the global resource management takes over the control of this resource. Thus, a global storage bin represents a partition that can only be reserved by the global resource management provided by SCP. Note, that the system administrator or the server itself, depending on a relevant policy, may re-claim the global resource in full or partially, by requesting its release from the SCP management. The native reservation management process (1020) as shown in FIG. 10, is responsible for monitoring resource consumption, and determining the server willingness to accept new requests. It is understood that, the native process may discriminate between application requests for global and local content. Additionally, a request for placement of a global replica may be declined or accepted, as controlled by a pre-installed policy that enables maximization of the cost of global resources that may be billed to a global resource requester. Such a policy may also depend on request statistics monitored by the SCP.

As mentioned, local storage resources are dedicated to storing persistent replicas of content, while transient replicas are replicated using the global storage. Further, the local storage bin is always associated with one or more local service bins, and a global storage bin is associated with one or more global service bins.

Figure 11:
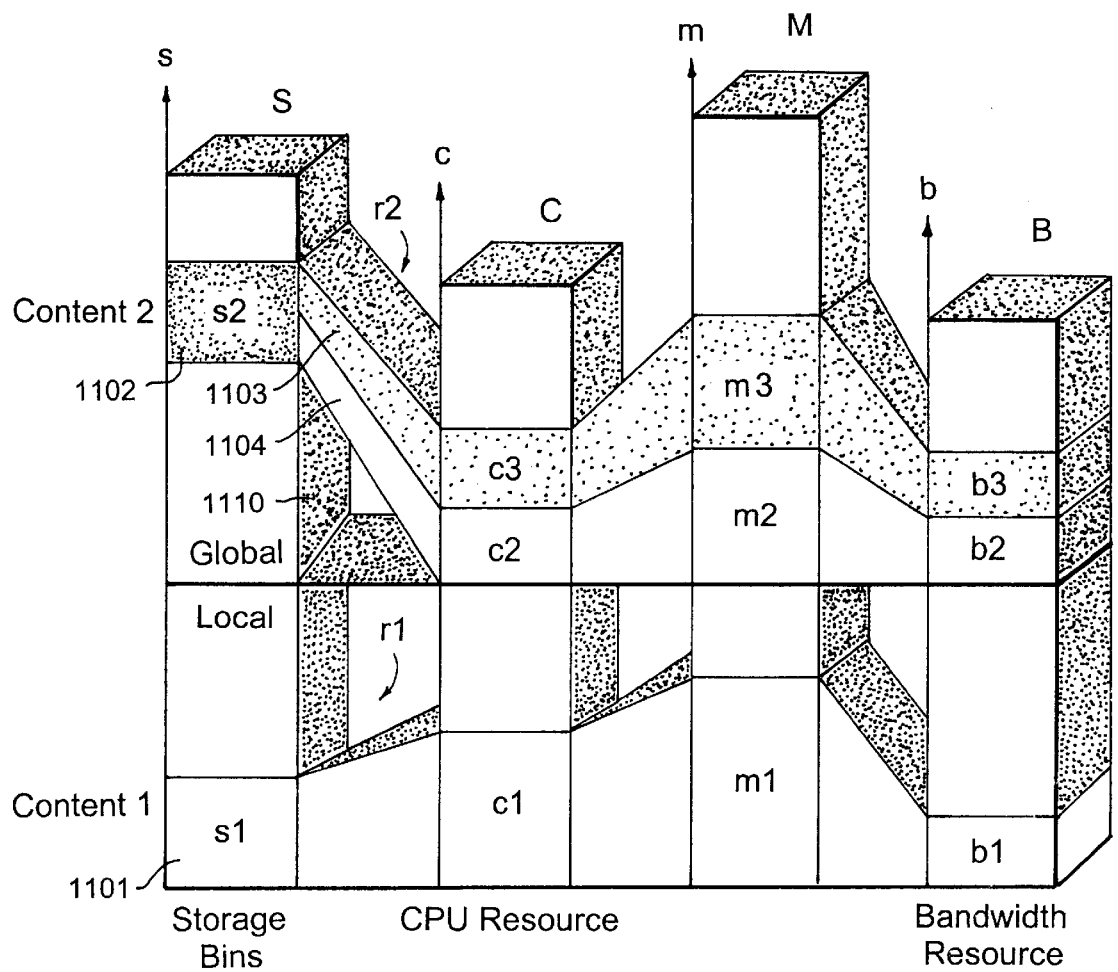
FIG. 11 illustrates an example scenario where a system administrator has configured all server resources onto two partitions, one local and one global.

FIG. 11 illustrates an example scenario where a system administrator has configured all server resources onto two partitions, one local and one global. As shown in the example scenario depicted in FIG. 11, two streaming applications share a transient content replica and consume one global storage bin s2 (1102) and two service bins r2 (1103) and r3 (1104), while one application consumes a persistent content replica included in service storage bin s1 (1101). Overall global storage resource consumed is thus equivalent to s2, while an overall global service resource is a sum of bins r2 and r3.

There are many useful applications of the present invention. First, the current QoS approach of many QoS management systems suggests decreasing of quality, if such an event occurs. Contrary to this, according to the invention, a customer will receive the quality which he/she agrees to pay for. Customers will most probably refuse to buy the content without the ironclad service guarantee, and may even disagree with the reduction of quality even if the charges for the service were reduced. The invention demonstrates how to provide a mutually agreed quality of service between the client and the system with a high level of service guarantees.

Additionally, the present invention may be used as a value-added service by a Internet Service Providers (ISP) to the content providers. It allows to support a broadcast content providers (such as, for illustrative purposes only, a cable TV News Network "NN") by dynamically matching demand to capacity of NN's servers. When necessary, the ISP would place transient replicas (of NN content) on its own global servers based on characteristics about the demand for NN content as presented to the ISP.

The present invention may additionally be used to provide statistical sharing of ISP resources (i.e., globally-shared servers) when supporting multiple broadcast content providers (such as for illustrative purposes only television and media networks). This way, the ISP controller may manage the allocation of replication requests according to some cost metric such as profit or content provider maximum loss protecting most likely, the best interest of the ISP.

In another implementation, each independent content provider runs a server referred to as a delegate controller behind its firewall. The delegate controller performs demand and capacity monitoring tasks for the content provider and when critical thresholds are exceeded, the delegate controller places a replication request to the ISP's controller. The ISP controller then arbitrates between pending replication requests and determines which replication requests get allocated to which global servers. In particular, the same global server may be shared across different delegate controllers.

A skilled artisan will appreciate that content providers, for security reasons, may not be willing to disclose nor allow another party to access its internal usage statistics. For this reason, content providers may be enabled to directly request the placement of a specific replica onto the ISP global servers. Furthermore, such request may be conditioned (by the content provider as opposed by the controller) to meet particular requirements such as geography or capacity of the target global server. The ISP controller may then try to locate one such particular global server satisfying such requirements. For example, a particular content provider may place a replication request such as "get me a replica of the following content within the next 5 minutes and locate such transient replica in a HIGH capacity server in the Southeast of the USA".

Moreover, according to the principles of the invention, ISPs may collaborate in agreements allowing an ISP to handoff replication requests to other ISPs having suitable global servers. For example, in the event that none of an ISP's global servers satisfies the requirements associated with a request placed by a content provider, the ISP would then handoff the replication request to some other friendly ISP.

Moreover, according to the principles of the invention, an auction for the placement of such replication request may be implemented by an intermediary party. Such intermediary party may then negotiate the handoff such replication request to the most capable or suitable party according to some cost metric such as cost or an expiration deadline.

A skilled artisan will appreciate that it is possible for a replica to be placed in a global server, which does no longer fit demand characteristics. To this end, the present invention augments the replica management system described in related U.S. patent application Ser. No. 09/335,273 now U.S. Pat. No. 6,466,980 by introducing of periodical sanity checks, i.e., implementation of a process to review and enhance the overall placement of transient replicas on the system, which is referred to herein referred to as replica migration.

In conjunction with the SCP, a final aspect of the invention is directed to a Resource Management Framework (RMF) which is an extensible, distributed, policy-based, object-oriented management framework that supports per-flow media session setup and control between one or more media servers and end users and may augment the SCP. This extensible framework is described in greater detail in commonly-owned, co-pending U.S. patent application Ser. No. 09/335,275 which is currently pending, entitled POLICY-BASED MULTIVARIATE APPLICATION-LEVEL QoS NEGOTIATION FOR MULTIMEDIA SERVICES, the whole contents and disclosure of which is incorporated by reference as if fully set forth herein. The RMF framework comprises a mandatory core set of basic functions upon which further features can be added. Such new extended functional compositions for the framework include the addition of user profiles and preferences, security (authentication and authorization), pricing and billing, reservations, resource monitoring and others. In addition, the policies, upon which management decisions and service selections are based, are >pluggable=and new or updated policies may be added, to augment or replace existing policy and allow new behavior or refinement of existing behavior.

The RMF is designed to augment the SCP to facilitate the management of the heterogeneous media streaming systems. The low-level network connections, streaming and media-control remain the domain of the media streaming systems. RMF hooks into those lower levels and provides a higher level management and control of those services. For example, the RMF includes QoS mapping down to media level services based on application level requests, but defers the setup of the network connections to the SCP. Where media streaming may be adaptively rate controlled and managed by the media server, within the bounds permitted by the QoS specification, then the media server can act autonomously. When it is unable to maintain the required QoS level then an exception is raised to the SCP, which may then, according to contact policies involved, attempt to expand or migrate the end-resources, and then re-map the clients requests, allowing them to receive services elsewhere.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by letters patent is:

1. A system for regulating server resources in a distributed wide area network comprising servers interconnected by a computer networking environment, said resources including multimedia object resources and resources for storing and streaming said multimedia objects to requesting clients, the system comprising:

first service management means implementing objects for receiving client requests for streaming object resources from a server to said client, generating statistics associated with demand for said object resources, and automatically mapping said requests to available servers in said network based on predetermined criteria, including user profiles for characterizing client resources and user preferences relating to receipt of said object resource, and per-flow services relating to one or more selected from the group comprising, transcoding object content, offered pricing for said content, billing, authorizing and authenticating users, and encrypting/decrypting data content, and wherein said first management means further includes one or more first negotiator objects for locating a service object in said distributed network capable of handling said request according to said predetermined criteria, generating and placing inquiries related to said received requests, and negotiating requests with a service object; and, second system management means implementing objects for automatically shaping capacity of object resources at said servers in said distributed network based on said demand statistics, current available capacity of said servers and a willingness factor associated with each server for providing said requested resource, said second management including means for automatically replicating an object associated with said objects resources and temporarily placing said object replicas at one or more server devices having available capacity according to said predetermined criteria, wherein performance for placing requests of said first management means has an input of and considers said capacity shaping provided by said second management means.

2. The system as claimed in claim 1, wherein said client resources includes one or more of processing power, memory, an available bandwidth for receiving said object content at a client resource.

3. The system as claimed in claim 1, wherein said user preferences includes preferable compression of said content, cost limitations for said content, and interactivity level including real-time interaction with flow of said object resource content.

4. The system as claimed in claim 1, wherein said criteria includes willingness of said servers to provide said requested services, and available capacity of said server for providing a streaming resource.

5. The system as claimed in claim 1, further including facade means for interfacing per-flow services with said first management means, said facade means enabling dynamic insertion of both resources and content in a manner transparent to clients.

6. A system for regulating server resources in a distributed wide area network comprising servers interconnected by a computer networking environment, said resources including multimedia object resources and resources for storing and streaming said multimedia objects to requesting clients, the system comprising:

first service management means implementing objects for receiving client requests for streaming object resources from a server to said client, generating statistics associated with demand for said object resources, and automatically mapping said requests to available servers in said network based on predetermined criteria, wherein said first management means further includes one or more first negotiator objects for locating a service object in said distributed network capable of handling said request according to said predetermined criteria, generating and placing inquiries related to said received requests, and negotiating requests with a service object, wherein first negotiator objects invoke a first directory service means for locating said service object, said first directory service means comprising a mapping of service objects to locations of associated object replicas at said servers, and said first negotiator objects invoke a second directory service for mapping available distributed servers with an available capacity rating, wherein said second directory service further maps a willingness indicator to an associated server, said willingness indicator indicating degree of willingness of a server to receive placement inquiries;

second system management means implementing objects for automatically shaping capacity of object resources at said servers in said distributed network based on said demand statistics, current available capacity of said servers and a willingness factor associated with each server for proving said requested resource, said second management including means for automatically replicating an object associated with said objects resources and temporarily placing said object replicas at one or more server devices having available capacity according to said predetermined criteria, wherein performance for placing requests of said first management means has an input of and considers said capacity shaping provided by said second management means wherein said second management means includes one or more service broker objects representing available servers in said network, said service broker objects interacting with said second negotiator objects for placing generated object replicas associated with an object resource to said global servers throughout said distributed network.

7. The system as claimed in claim 6, wherein said second management means includes means for generating object replicas associated with object resources for placement at global servers throughout said distributed network, said second management means further including one or more second negotiator objects for distributing object replicas over available servers.

8. The system as claimed in claim 7, wherein said second management means generates object replicas on demand.

9. The system as claimed in claim 7, wherein a number of generated object replicas associated with an object resource is determined in accordance with predicted demand for a given object.

10. The system as claimed in claim 1, wherein said servers in said network are normalized as comprising a storage bin of a size for storing object resource content, said second management means managing placement of content across storage bins so that access optimizations may be made.

11. The system as claimed in claim 10, wherein said servers in said network are normalized by representing a server as comprising an associated service bin characterized as a tuple comprising memory, CPU allocation and streaming bandwidth required for provisioning services.

12. The system as claimed in claim 10, wherein a object resource streaming connection between a server and a client is instantiated by binding a storage bin of an associated server to its service bin while taking into account one or more quality of service parameters.

13. The system as claimed in claim 12, wherein a streaming connection is instantiated by binding a storage bin of an associated server to its service bin while taking into account one or more quality of service parameters.

14. The system as claimed in claim 10, wherein said second management means manages placement of content across storage bins according to geography of demand.

15. The system as claimed in claim 14, wherein said second management means manages placement of content across storage bins in a manner so as to support peak demand.

16. The system as claimed in claim 14, further including a signaling protocol clients and content servers enabling control servers to monitor the placement of requests from clients onto said servers.

17. The system as claimed in claim 1, wherein the wide area network comprises the Internet.

18. A method for regulating server resources in a distributed wide area network comprising servers interconnected by a computer networking environment, said resources including multimedia object resources and resources for storing and streaming said multimedia objects to requesting clients, the method comprising:

providing objects for receiving client requests for streaming object resources from a server to said client, generating statistics associated with demand for said object resources, and automatically mapping said requests to available servers in said network based on predetermined criteria, wherein said step of automatically mapping requests further includes steps of, implementing one or more first negotiator objects for locating a service object in said distributed network capable of handling said request according to said predetermined criteria, generating and placing inquiries related to said received requests, and negotiating requests with a service object, which step of negotiating requests includes the step of negotiating for per-flow services and implementing one or more facades for dynamically inserting optional including both resources and content in a manner transparent to clients, said per-flow services including transcoding object content, offered pricing for said content, billing, authorizing and authenticating users, and encrypting/decrypting data content;

automatically shaping capacity of object resources at said servers in said distributed network based on said demand statistics, current available capacity of said servers and a willingness factor associated with each server capable of providing said requested resource;

automatically replicating an object associated with said objects resources and temporarily placing said object replicas at one or more server devices having available capacity according to said predetermined criteria, wherein performance for placing requests for streaming object resources has an input of and considers said capacity shaping step; and characterizing client resources according to user profiles and user preferences relating to receipt of said object resource, and implementing said user profiles and user preferences as said predetermined criteria.

19. The method as claimed in claim 18, wherein said step of locating a service object includes referencing a first directory service for mapping service objects to locations of associated object replicas at said servers.

20. The method as claimed in claim 19, further including referencing a second directory service for mapping available distributed servers with an available capacity rating.

21. The method as claimed in claim 20, further including referencing a second directory service for mapping available distributed servers with a willingness indicator indicating a degree of willingness of a server to receive placement inquiries.

22. The method as claimed in claim 18, wherein said step of automatically replicating an object associated with said objects resources and temporarily placing said object replicas at one or more server devices includes implementing or more second negotiator objects for distributing object replicas over available servers.

23. The method as claimed in claim 18, wherein said step of generating statistics associated with demand for said object resources includes:

predicting a demand for a given object resource; and, determining a number of generated object replicas associated with said predicted demand.

24. The method as claimed in claim 22, further including providing one or more service broker objects representing available servers in said network for interaction with said second negotiator objects to place generated object replicas associated with an object resource to said global servers throughout said distributed network.

25. The method as claimed in claim 18, further including characterizing said servers in said network as comprising a storage bin of a size for storing object resource content, and managing placement of content across storage bins.

26. The method as claimed in claim 25, further including characterizing said servers in said network as comprising an associated service bin including a tuple comprising memory, CPU allocation and streaming bandwidth required for provisioning services.

27. The method as claimed in claim 26, further including the step of instantiating an object resource streaming connection between a server and a client by binding a storage bin of an associated server to its service bin while taking into account one or more quality of service parameters.

28. The method as claims in claim 18, further including implementing a signaling protocol between clients and content servers for monitoring the placement of requests from clients onto said servers.

29. The method as claimed in claim 18, wherein the wide area network comprises the Internet.

* * * * *